(12) United States Patent
Coombs (10) Patent No.: US 11,994,047 B2
(45) Date of Patent: May 28, 2024

(54) WIRELESS DRAIN PLUG

(71) Applicant: AKTV8 LLC, Wixom, MI (US)

(72) Inventor: Joshua Coombs, Wixom, MI (US)

(73) Assignee: AKTV8 LLC, Wixom, MI (US)

( * ) Notice: Subject to any disclaimer, the term of this patent is extended or adjusted under 35 U.S.C. 154(b) by 0 days.

(21) Appl. No.: 18/097,065

(22) Filed: Jan. 13, 2023

(65) Prior Publication Data

US 2023/0228204 A1    Jul. 20, 2023

Related U.S. Application Data (60) Provisional application No. 63/299,911, filed on Jan. 14, 2022.

(51) Int. Cl.
*F01M 11/04*    (2006.01)

(52) U.S. Cl.
CPC . F01M 11/0408 (2013.01); *F01M 2011/0416* (2013.01); *F01M 2250/60* (2013.01); *F01M 2250/66* (2013.01)

(58) Field of Classification Search
CPC ....... F01M 11/0408; F01M 2011/0416; F01M 2250/60; F01M 2250/66
See application file for complete search history.

(56) References Cited

U.S. PATENT DOCUMENTS

| 7,786,864 B1 | 8/2010 | Shostak et al. |
| 2007/0193348 A1 | 8/2007 | Rutherford |
| 2015/0163568 A1* | 6/2015 | Von Herzen ........... G01N 27/02 340/870.07 |
| 2016/0210793 A1* | 7/2016 | Staley ................... G07C 5/006 |
| 2016/0290191 A1* | 10/2016 | Staley ................... F01M 11/12 |

FOREIGN PATENT DOCUMENTS

| GB | 2575656 A | 1/2020 |
| WO | 2015143431 A2 | 9/2015 |

OTHER PUBLICATIONS

International Search Report and Written Opinion from European Patent Office dated Apr. 28, 2023 (12 Pages) from counterpart PCT Application No. PCT/US2023/010843.

* cited by examiner

*Primary Examiner* — Syed O Hasan
(74) *Attorney, Agent, or Firm* — William H. Honaker; Dickinson Wright PLLC (57) ABSTRACT

A drain plug for a component of a vehicle includes: a plug body having a stem portion configured to plug a corresponding hole in the component of the vehicle, and a sensor module. The sensor module includes a sensor and a wireless transmitter configured to transmit data regarding a reading from the at least one sensor. The sensor includes at least one of a temperature sensor, a pressure sensor, and an accelerometer. A system for wireless monitoring a component of a vehicle includes: a plug body having a stem portion configured to plug a corresponding hole in the component of the vehicle, and a sensor module having at least one sensor and a wireless transmitter configured to transmit data regarding a reading from the at least one sensor. The system also includes a receiver located on the vehicle and configured to receive the data from the wireless transmitter.

20 Claims, 6 Drawing Sheets

WIRELESS DRAIN PLUG

CROSS REFERENCE TO RELATED APPLICATIONS

This U.S. utility patent application claims the benefit of U.S. Provisional Patent Application No. 63/299,911 filed Jan. 14, 2022, the contents of which is incorporated herein by reference in its entirety.

BACKGROUND

1. Field of the Invention

The present disclosure relates generally to sensing one or more physical characteristics in a motor vehicle. More specifically, the present disclosure relates to a device and system to add sensing capabilities and wireless communication of data regarding the sensed characteristics.

2. Description of the Prior Art

Many different vehicles have hubcaps, transmissions, and differentials that contain oil or other lubricant. Monitoring temperature of the lubricant within such devices can allow notification of elevated temperature and can prevent failures, vehicle downtime, and costly roadside repairs. These devices also commonly include bearings, where monitoring acceleration can find bearing wear or failures before catastrophic failure, which can allow vehicle operators to service the failing bearing before it becomes a major roadside failure. Transmissions and differentials commonly include cases made of cast aluminum or steel, which not easy to modify to add sensors to. These devices commonly have drain plugs in them for draining the lubricant therefrom. Harnesses are also hard to route and secure to wheel ends and axles which are bouncing down the road over bumps and which may be exposed to buildup of debris, such as mud, snow, ice, etc. It is not easy to add a wired sensor to these devices.

Commercial vehicle fleets are particularly motivated to monitor vehicle systems so preventive maintenance can identify issues before they become roadside failures that can be substantially more costly than scheduled service.

SUMMARY

The present disclosure provides a drain plug for a component of a vehicle. The drain plug includes: a plug body having a stem portion configured to plug a corresponding hole in the component of the vehicle; a sensor module including at least one sensor and a wireless transmitter configured to transmit data regarding a reading from the at least one sensor; a tubular sleeve disposed in the plug body and defining an external thread on an outer surface thereof; and a sensor cap assembly configured to screw onto the external thread of the tubular sleeve and to hold the sensor module thereto. The at least one sensor includes at least one of: a temperature sensor, a pressure sensor, and/or an accelerometer.

The present disclosure also provides a drain plug for a component of a vehicle. The drain plug includes: a sensor module including at least one sensor and a wireless transmitter configured to transmit data regarding a reading from the at least one sensor. The drain plug also includes a plug body having a stem portion configured to plug a corresponding hole in the component of the vehicle. The stem portion defines a blind hole in fluid communication with the sensor module, and the stem portion is sealed to fluidly isolate the sensor module and an internal space of the component of the vehicle. The drain plug also includes a tubular sleeve disposed in the blind hole, extending outwardly therefrom, and defining an external thread on an outer surface thereof outside of the blind hole. The drain plug also includes a sensor cap assembly configured to screw onto the external thread of the tubular sleeve and to hold the sensor module thereto.

The present disclosure also provides a system for wireless monitoring a component of a vehicle. The system includes a drain plug including: a plug body having a stem portion configured to plug a corresponding hole in the component of the vehicle, and a sensor module having at least one sensor and a wireless transmitter configured to transmit data regarding a reading from the at least one sensor. The system also includes a receiver located on the vehicle and configured to receive the data from the wireless transmitter. The at least one sensor includes at least one of a temperature sensor, a pressure sensor, and an accelerometer.

BRIEF DESCRIPTION OF THE DRAWINGS

Further details, features and advantages of designs of the invention result from the following description of embodiment examples in reference to the associated drawings.

DETAILED DESCRIPTION

Referring to the drawings, the present invention will be described in detail in view of following embodiments.

The present disclosure provides a drain plug with sensors, a microchip, and wireless communication that allows simple drain plug replacement with an intelligent sensor suite that can monitor temperature, pressure, and acceleration with on-board micro processing to discern failures and alert operators/fleets before a major failure occurs. The sensor module is battery powered and easy to retro-fit on vehicles. The module can communicate with mobile devices or a separate control unit.

The present disclosure provides a drain plug with sensors, microchip, and wireless communication that allows simple drain plug replacement with an intelligent sensor suite that can monitor temperature, pressure, and acceleration with on-board micro processing to discern failures and alert operators/fleets before a major failure occurs. The drain plug of the present disclosure includes a battery-powered sensor module with wireless communication capabilities—no need to run harness—and easy to retro-fit on vehicles. The drain plug of the present disclosure can communicate with mobile devices or a separate Control Unit. A commercial vehicle system that includes drain plugs with sensors in hubcaps and differentials, communicating to a pneumatic control module is also provided. The pneumatic control module can light its diagnostics LED to alert the driver if there is an imminent failure happening and send data via telemetry to Fleet command center to alert them of the issue.

Figure 1:
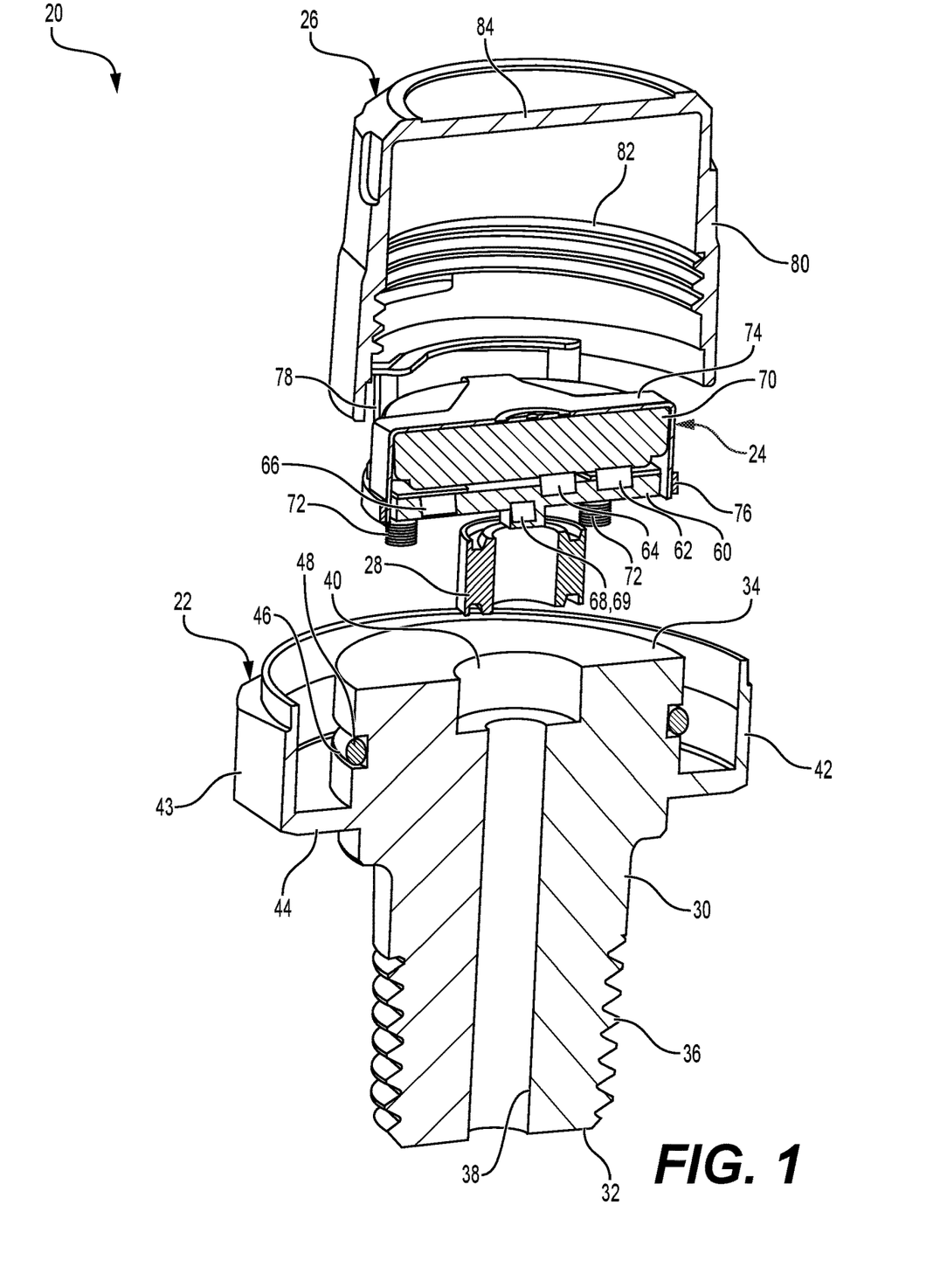
FIG. 1 shows an exploded cross-sectional perspective view of a first sensor plug of the present disclosure.

The drain plug of the present disclosure can detect one or more of temperature, pressure, and acceleration. The drain plug of the present disclosure may be used with a system that can generate an alert based on the temperature exceeding a threshold value for a predetermined period of time, which may be indicative of an overheating condition. Additionally or alternatively, the drain plug of the present disclosure may be used with a system that can generate an alert based on the pressure being above a predetermined high pressure threshold indicative of a high-pressure condition or below a predetermined low pressure threshold indicative of a low-pressure condition. Additionally or alternatively, the drain plug of the present disclosure may be used with a system that can generate an alert based on the acceleration indicative of a fault or warning condition. Such acceleration-based conditions may include, for example, an acceleration pattern indicative of a bearing failure, a high-impulse acceleration indicative of an impact, such as a curb strike. The acceleration-based conditions may include other acceleration-based patterns that can indicate a imbalance, such as a flat spot or a tire that is out of balance. Fleet managers and operators may use the collected data in any case where failures result in downtime and costly roadside repairs As shown in FIG. 1, a first sensor plug 20 includes a first plug body 22, a first sensor module 24, and a first plug cap 26. The first sensor plug 20 is configured to screw into a hole, such as a drain hole, in place of a standard drain plug in a component of a vehicle, such as a transmission, a differential, or a wheel hub.

The first plug body 22 includes a first stem portion 30 having a rod shape that extends between a first distal end 32 and a first proximal end 34. The first stem portion 30 is configured to plug a corresponding hole, such as a fluid drain hole, in the component of the vehicle. The first stem portion 30 defines a first external thread 36 for engaging an internal thread in the hole in the component of the vehicle (not shown in FIG. 1). The first stem portion 30 also defines a bore hole 38 extending coaxially therethrough from the first distal end 32 to the first proximal end 34. The first stem portion 30 also defines a first well 40 intersecting the bore hole 38 having a diameter larger than the bore hole 38 and extending from the first proximal end 34 for a short distance into the first stem portion 30. For example, the first well 40 may have a depth of 5 mm to 10 mm. A first tubular seal 28, which may be made of rubber or another resilient material, is disposed in the first well 40 and provides a seal with a lower surface of the first sensor module 24, while allowing fluid communication between a small patch on the lower surface of the first sensor module 24 and an internal space of the component of the vehicle, via the bore hole 38. This fluid communication may allow the first sensor module 24 to measure temperature and/or pressure within the internal space of the component of the vehicle, while also blocking fluid from escaping from the internal space of the component of the vehicle.

The first plug body 22 also includes a first peripheral tube 42 that extends annularly about the first stem portion 30 adjacent to the first proximal end 34. The first peripheral tube 42 defines a plurality of first flat faces 43 at regular intervals thereabout for engaging a tool, such as a socket wrench, for installing or removing the first plug body 22 from the component of the vehicle. A first flange portion 44 extends annularly about the first stem portion 30 between the first external thread 36 and the first proximal end 34. The first flange portion 44 connects the first peripheral tube 42 with the first stem portion 30. The first stem portion 30 of the first plug body 22 also defines a first annular slot 46 in an outer surface thereof between the first flange portion 44 and the first proximal end 34. A first O-ring 48 is disposed in the first annular slot 46 for providing a water-tight seal with the first plug cap 26.

The first sensor module 24 is disposed adjacent to the first proximal end 34 of the first plug body 22 and is configured to measure one or more physical characteristics of the component of the vehicle, such as temperature, pressure, and/or acceleration. The first sensor module 24 includes a first printed circuit board assembly (PCBA) 60 having a substrate such as a printed circuit board, a first processor 62, a first wireless communications interface 64, and one or more sensors 66, 68, 69. The sensors 66, 68, 69 may include an accelerometer 66, a temperature sensor 68, and/or a pressure sensor 69. However, the first sensor module 24 may include a different combination of sensors and/or one or more other types of sensors. One or more of the sensors 66, 68, 69 may have a direct exposure to an internal space of the component of the vehicle, via the bore hole 38. The first processor 62 may include a microprocessor, microcontroller and/or other processing circuitry. The first processor 62 may perform some processing signal from the one or more sensors 66, 68, 69. For example, the first processor 62 may compare one or more acceleration signals from the accelerometer 66 in order to determine if the one or more acceleration signals are indicative of bearing wear or an imbalance condition in a rotating assembly within the component of the vehicle.

The first sensor module 24 also includes a battery 70, such as a coin cell type battery. One or more feet 72 are attached to a bottom surface of the first PCBA 60 and configured to engage the first proximal end 34 of the first plug body 22. The feet 72 may be made of a helical coil of wire. The feet 72 may provide some vibration isolation therebetween. Alternatively or additionally, the feet 72 may be configured to allow transmission of vibration and/or heat therebetween. A shell 74 of metal, such as stainless steel, holds the battery 70 to the first PCBA 60. A retaining ring 76 extends annularly about the shell 74 and the first PCBA 60 for securing the shell 74 to the first PCBA 60. A hold-down clip 78, which may be made of a bent piece of sheet metal, holds the first sensor module 24 in place on the first proximal end 34 of the first plug body 22.

The first plug cap 26 is disposed over an end of the first plug body 22, opposite from the first stem portion 30 and encloses the first sensor module 24 to protect the first sensor module 24 from exposure to moisture, dust, or other contaminants. The first plug cap 26 may be made of a material that is transmissive to radio waves, such as plastic. The first plug cap 26 has a cup shape including a first tubular wall 80 that defines a first internal thread 82 for securement to the first stem portion 30 of the first plug body 22. The first plug cap 26 also includes a closed top 84 that encloses the cup shape for containing the first sensor module 24 therein.

Figure 2:
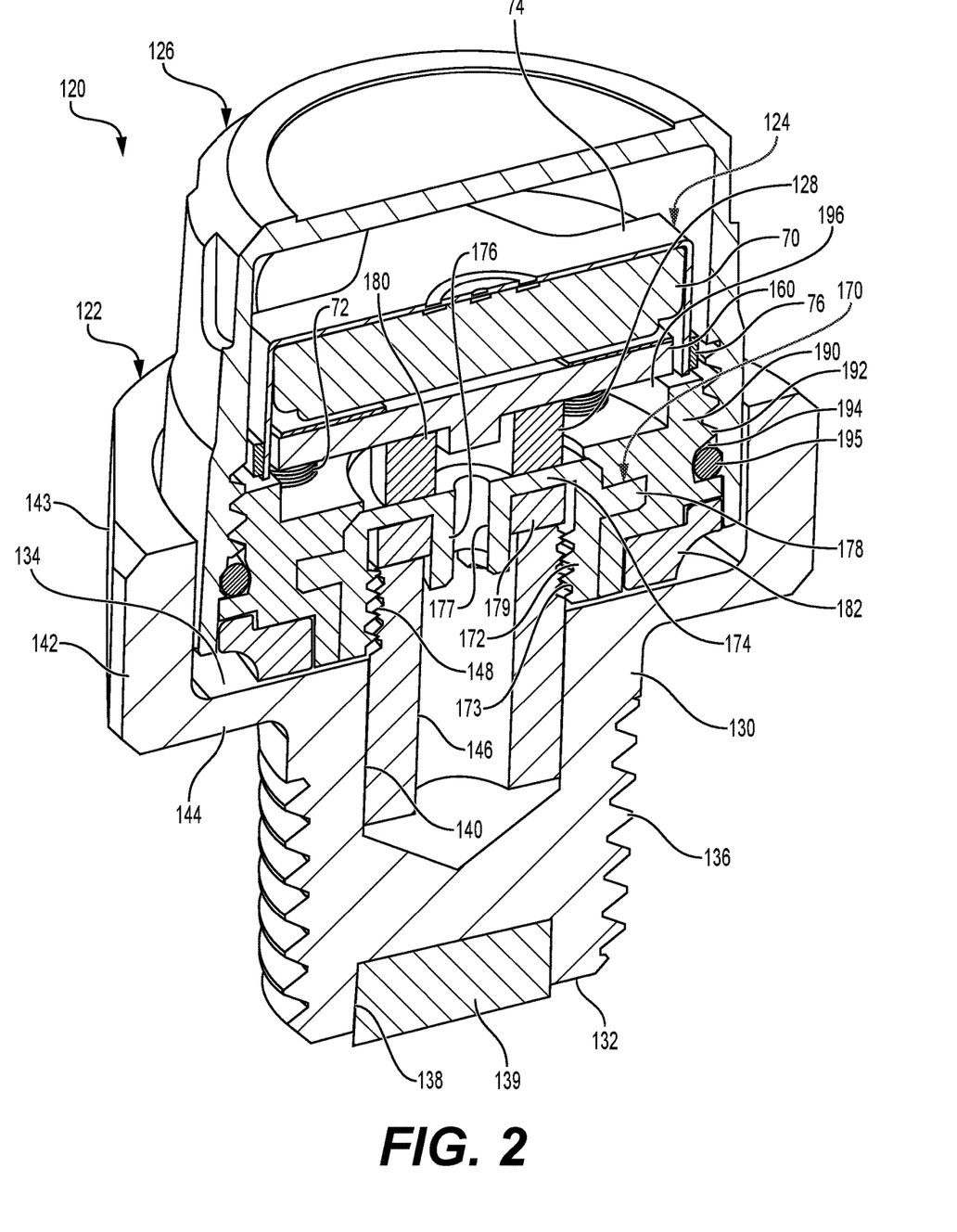
FIG. 2 shows a cross-sectional perspective view of a second sensor plug of the present disclosure.
Figure 3A:
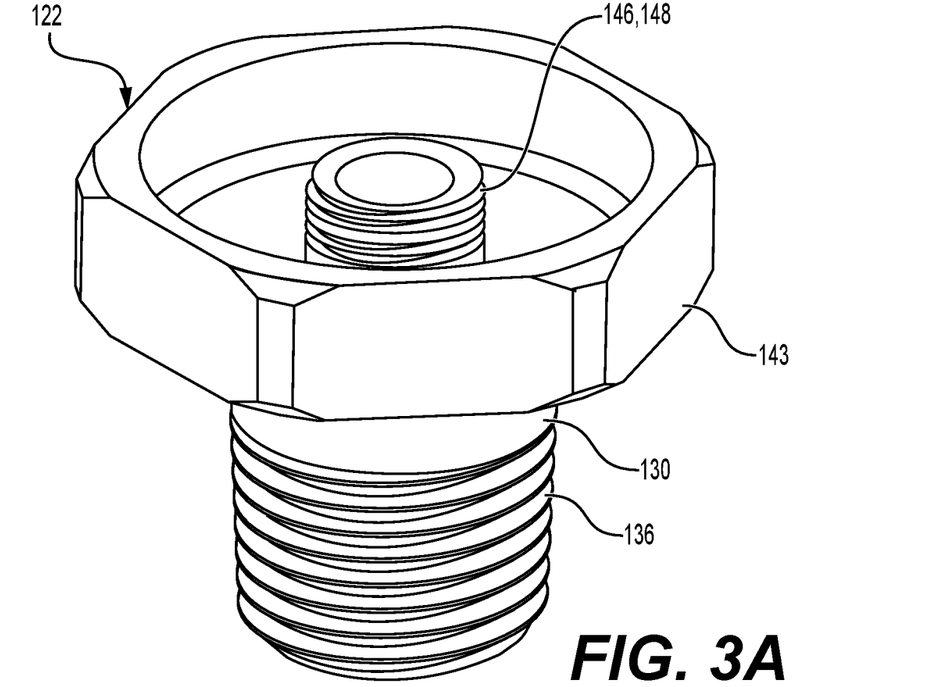
FIG. 3A shows a perspective view of a body of the sensor drain plug of FIG. 2.
Figure 3B:
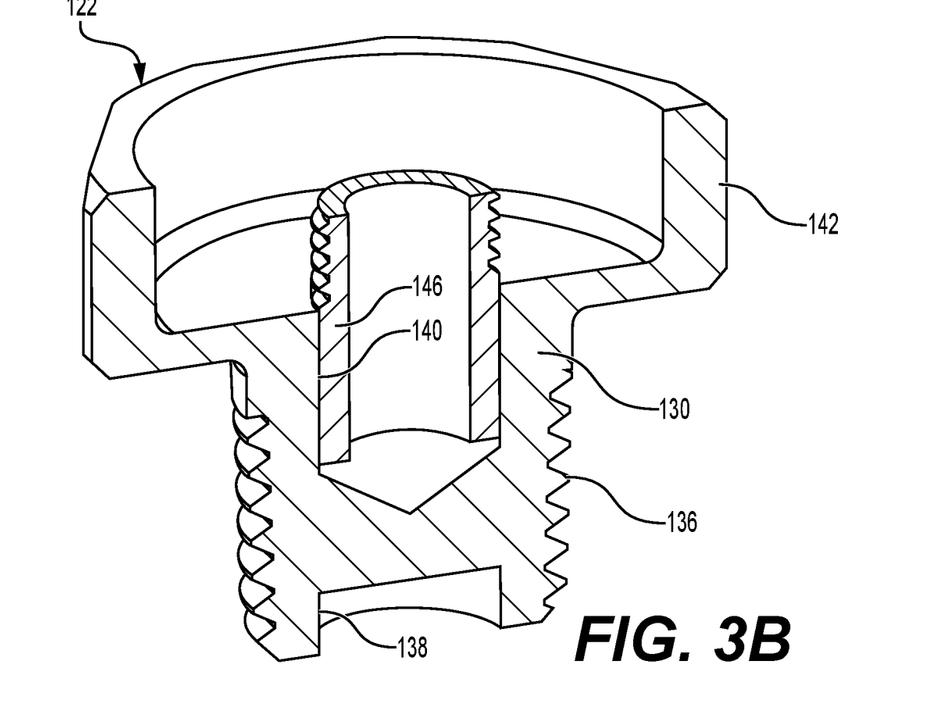
FIG. 3B shows a cross-sectional perspective view of the body of the second sensor plug of FIG. 2.

FIGS. 2, and 3A-3B show a second sensor plug 120 of the present disclosure. The second sensor plug 120 may be similar or identical to the first sensor plug 20, except for some differences described herein.

As shown in FIG. 2, the second sensor plug 120 includes a second plug body 122, a second sensor module 124, and a second plug cap 126. The second sensor plug 120 is configured to screw into a hole, such as a drain hole, in place of a standard drain plug in a component of a vehicle, such as a transmission, a differential, or a wheel hub. The second plug cap 126 may be similar or identical to the first plug cap 26 of the first sensor plug 20.

The second plug body 122 includes a second stem portion 130 having a rod shape that extends between a second distal end 132 and a second proximal end 134. The second stem portion 130 defines a second external thread 136 for engaging an internal thread in the hole in the component of the vehicle (not shown in FIG. 2). The second stem portion 130 also defines a recess 138 in the second distal end 132 that receives and holds a magnet 139 therein. The magnet 139 may serve to hold metal pieces, such as shavings shed during operation of the component of the vehicle. The second stem portion 130 also defines a blind hole 140 extending from the second proximal end 134 and part-way through second stem portion 130 and coaxially therewith. The blind hole 140 may provide thermal communication between the second sensor module 124, or a temperature sensor attached thereto, and a fluid within the internal space of the component of the vehicle, while preventing fluid communication therebetween. Thus, the blind hole 140 may provide improved sensing accuracy of the fluid within the internal space of the component of the vehicle, while also preventing the second sensor module 124 from directly contacting the fluid within the fluid within the internal space of the component of the vehicle.

The second plug body 122 also includes a second peripheral tube 142 that extends annularly about the second stem portion 130 adjacent to the second proximal end 134. The second peripheral tube 142 defines a plurality of second flat faces 143 at regular intervals thereabout for engaging a tool, such as a socket wrench, for installing or removing the second plug body 122 from the component of the vehicle. A second flange portion 144 extends annularly about the second stem portion 130 between the second external thread 136 and the second proximal end 134. The second flange portion 144 connects the second peripheral tube 142 with the second stem portion 130.

A tubular sleeve 146 is disposed in the blind hole 140 and extends outwardly therefrom, beyond the second proximal end 134. The tubular sleeve 146 may be press fit within the bind hole. Alternatively or additionally, the tubular sleeve 146 may be attached to the second stem portion 130 by one or more other means, such as a threaded connection, by welding, and/or with an adhesive. The tubular sleeve 146 defines a third external thread 148 on an outer surface thereof outside of the blind hole 140. The tubular sleeve 146 with the third external thread 148 may match an external thread of a Schrader valve.

A sensor cap assembly 170 is configured to screw onto the third external thread 148 of the tubular sleeve 146 and to hold the second sensor module 124 thereto. Where the third external thread 148 has a Schrader-type thread, matching the thread of a standard Schrader valve, a standard part may be used for both the sensor cap assembly 170 and for a tire-pressure monitoring device configured to screw onto a Schrader valve of a tire valve stem. This can provide for an economy of scale, allowing the sensor cap assembly 170 to be sourced easily and inexpensively. Additionally or alternatively, the tubular sleeve 145 may be used with the first sensor plug 20. For example, the tubular sleeve 145 may be disposed partially within the bore hole 38 and protruding therefrom for attaching the sensor cap assembly 170.

The sensor cap assembly 170 includes a second tubular portion 172 that surrounds and screws onto the third external thread 148 of the tubular sleeve 146. A semi-closed top 174 covers an end of the second tubular portion 172. The sensor cap assembly 170 also includes a third tubular portion 176 that defines a through-passage 177 providing fluid communication into the blind hole 140 via the tubular sleeve 146. A first ring seal 179 extends between a lower surface of the semi-closed top 174 and an upper edge of the tubular sleeve 146 for providing a liquid-tight seal therebetween. The sensor cap assembly 170 also includes a radial protrusion 178 that extends radially outwardly from the second tubular portion 172. A sensor cap covering 190 is disposed about the sensor cap assembly 170 and molded around the radial protrusion 178. A second ring seal 182 is disposed between the sensor cap covering 190 and the second proximal end 134 of the second stem portion 130 for providing a liquid-tight seal therebetween. The first ring seal 179 and/or the second ring seal 182 may be made of rubber or other resilient material. The sensor cap covering 190 defines a fourth external thread 192 and a second annular slot 194 in an outer surface thereof and holding a second O-ring 195 for providing a water-tight seal with the second plug cap 126. The sensor cap covering 190 also defines a second well 196 in an upper surface thereof for receiving the second sensor module 124.

A second tubular seal 180, which may be made of rubber or another resilient material, is disposed in the second well 196 and provides a seal between a lower surface of the second sensor module 124 and an upper surface of the semi-closed top 174 of the sensor cap assembly 170, while allowing fluid communication between a small patch on the lower surface of the second sensor module 124 and an internal space of the blind hole 140. This fluid communication may allow the second sensor module 124 to more accurately measure a temperature within the internal space of the component of the vehicle, while also blocking fluid from escaping from the internal space of the component of the vehicle.

The second sensor module 124 may be similar or identical to the first sensor module 24. The second sensor module 124 includes a second PCBA 160. Because the second sensor plug 120 includes no fluid connection to the component of the vehicle, the second sensor plug 120 may include no pressure sensor.

Figure 4:
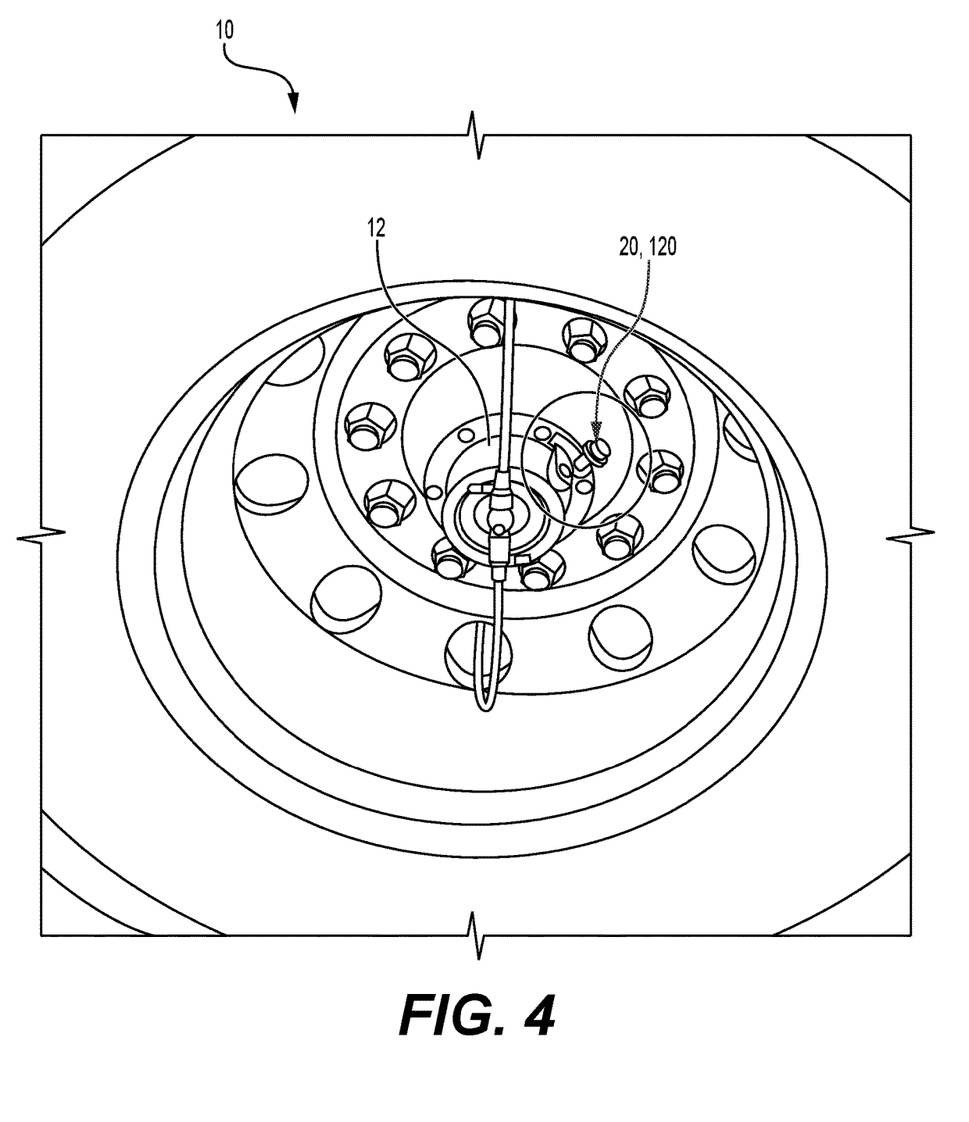
FIG. 4 shows a sectional view of a hub of a truck tire including a sensor plug of the present disclosure.

FIG. 4 shows a component 12 of a vehicle 10 with a sensor plug 20, 120 of the present disclosure. More specifically, the component 12 shown in FIG. 4 is a wheel hub of a truck tire.

Figure 5:
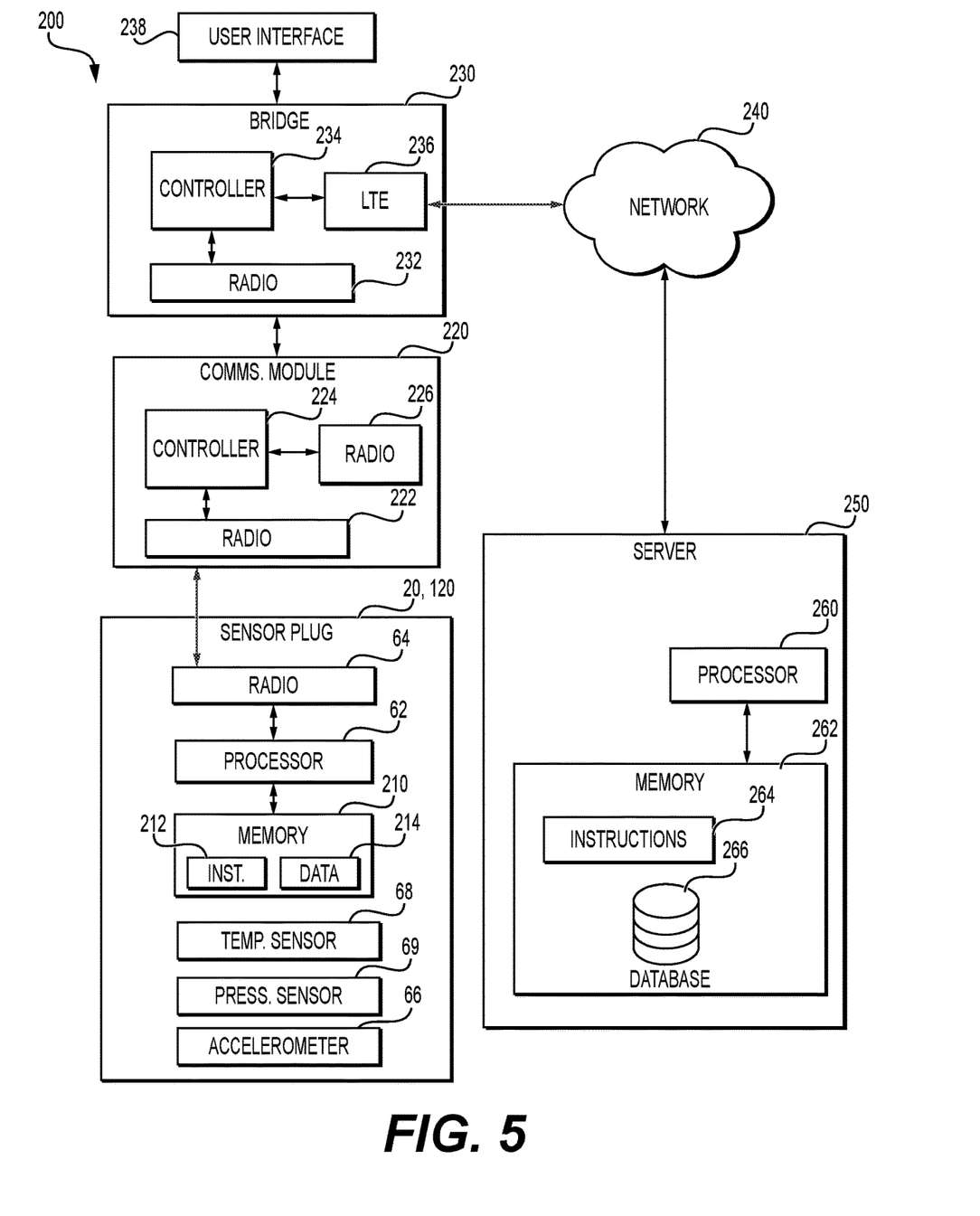
FIG. 5 shows a block diagram of a system for remote monitoring signals from a sensor plug, in accordance with an aspect of the present disclosure.

FIG. 5 shows a block diagram of a system 200 for remote monitoring signals from a sensor plug 20, 120. The system includes one or more sensor plugs 20, 120 which may include one or more of the first sensor plug 20 and/or one or more of the second sensor plug 120. As shown, the sensor plug 20, 120 includes a first processor 62 operably connected to a temperature sensor 68, a pressure sensor 69, and an accelerometer 66 for receiving signals therefrom regarding corresponding sensed parameters. The sensor plug 20, 120 includes a first wireless communications interface 64, which may include a radio that is operably connected to the processor for communicating data regarding the sensed values from one or more of the sensors 66, 68, 69. The first wireless communications interface 64 may include a digital communications interface, such as a Bluetooth, Wi-Fi, Zig-Bee, or other short-range or medium-range communications interface.

The sensor plug 20, 120 includes first processor 62 coupled to a first storage memory 210. The first storage memory 210 stores instructions, such as program code for execution by the first processor 62, in a first instruction storage 212. The first storage memory 210 also includes a first data storage 214 for holding data to be used by the first processor 62. The first data storage 214 may record, for example, values of the parameters measured by one or more of the sensors 66, 68, 69, stored diagnostic trouble codes (DTCs) and/or the outcome of one or more functions calculated by the first processor 62.

Figure 6:
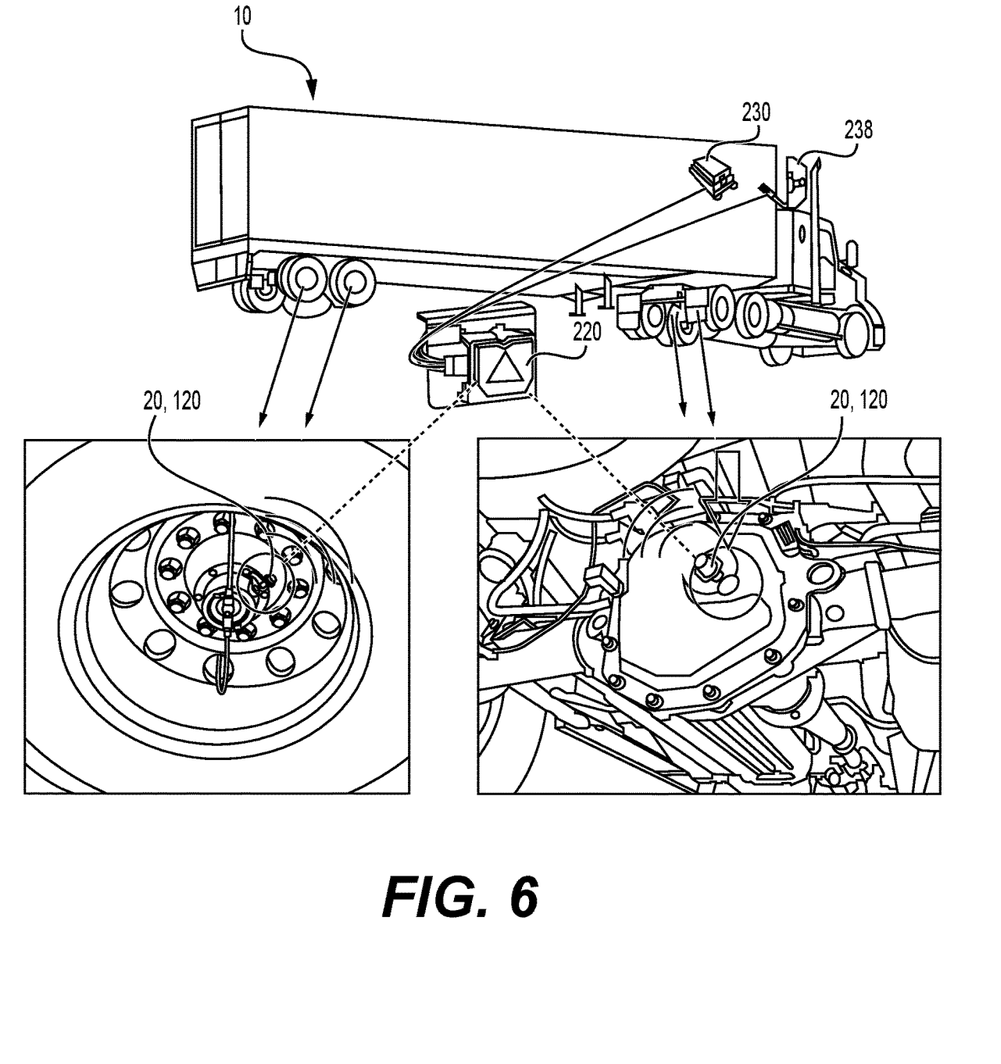
FIG. 6 shows a diagram of a system for remote monitoring signals from sensor plugs mounted in each of a wheel hub and a differential of a semi-truck, in accordance with an aspect of the present disclosure.

The system 200 also includes a receiver located on the vehicle and configured to receive the data from first wireless communications interface 64 of one or more of the sensor plugs 20, 120. For example, as shown in FIG. 6, the system 200 includes a communications module 220 configured to receive the data from the sensor plug 20, 120. The communications module 220 may be integrated within a pneumatic controller, which may be located on or near an axle of the vehicle 10. The communications module includes second wireless communications interface 222 configured to communication with one or more of the sensor plugs 20, 120, and a third wireless communications interface 226 configured to communicate with one or more other devices within the vehicle 10. Either or both of the second wireless communications interface 222 and/or the third wireless communications interface 226 may include a digital communications interface, such as a Bluetooth, Wi-Fi, ZigBee, or other short-range or medium-range communications interface. The communications module 220 also includes a first controller 224, which may include a microprocessor or a microcontroller, and which is programmed to control storage and transfer of data between the second wireless communications interface 222 and the third wireless communications interface 226.

The system 200 also includes a bridge 230 that is located on the vehicle and configured to collect information from one or more of the sensor plugs 20, 120 located throughout the vehicle 10 and to enunciate a warning or fault message based on data sensed by the sensor plugs 20, 120. In some embodiments, and as shown on FIG. 5, the bridge 230 is operably connected to a user interface 238, such as a warning light or a warning message on a display screen to notify an operation of the vehicle 10 regarding an error condition sensed by the se one or more of the sensor plugs 20, 120.

The bridge 230 includes a fourth wireless communications interface 232, such as a Bluetooth, Wi-Fi, ZigBee, or other short-range or medium-range communications interface, to receive information from one or more of the communications modules 220. Alternatively or additionally, the fourth wireless communications interface 232 may receive data directly from one or more of the sensor plugs 20, 120, without an intermediate communication module 220.

The bridge 230 also includes a telemetry interface 236, such as a long term evolution (LTE) cellular data modem for communicating information about the vehicle 10 to a remote receiver. The telemetry interface 236 may use other types of communications, such as other cellular data standards, vehicle-to-everything (V2X), peer-to-peer, satellite-based communications, etc. The bridge 230 also includes a second controller 234, which may include a microprocessor or a microcontroller, and which is programmed to control storage and transfer of data between the fourth wireless communications interface 232 and the telemetry interface 236 and/or to control enunciation of messages by the user interface 238 based on the data from the sensor plugs 20, 120.

The system 200 also includes a server 250, which may store and/or process data from a fleet of vehicles, using telemetry data from the bridge 230 in the vehicle 10, and which is communicated via one or more networks 240. The one or more networks 240 may include, for example, a cellular data network, the Internet, and one or more wide-area and/or local-area networks. The server 250 includes a second processor 260 coupled to a second storage memory 164. The second storage memory 262 includes a second instruction storage 264 storing instructions, such as program code for execution by the second processor 260. The second storage memory 262 also includes a second data storage 266 for holding data for use by the second processor 260. The second data storage 266 may include a database configured to record, for example, values of the parameters measured by one or more sensors 66, 68, 69 and/or the outcome of functions calculated by the first processor 62 in the sensor plugs 20, 120. Additionally or alternatively, the second data storage 266 of the server 250 may store message data, such as records of warning or fault messages associated with the components 12 of the vehicle 10 that are monitored by the sensor plugs 20, 120. For example, the second data storage 266 may store a listing of error messages, which may identify a particular date, time, component 12, sensed value, etc.

FIG. 6 shows a diagram of a system for remote monitoring signals from sensor plugs 20, 120 mounted in each of a wheel hub and a differential of a vehicle 10. FIG. 6 shows the vehicle 10 as a semi-truck/trailer that includes the sensor plugs 20, 120 in communication with a bridge 230 via a communications module 220. FIG. 6 also shows the vehicle 10 including the user interface 238 in the cab for enunciating a fault condition to an operator of the vehicle 10.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions. Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drain plug for a component of a vehicle, comprising:
   a plug body defining a hole and having a stem portion configured to plug a corresponding hole in the component of the vehicle;
   a sensor module including at least one sensor and a wireless transmitter configured to transmit data regarding a reading from the at least one sensor;
   a tubular sleeve disposed in the hole within the plug body, the tubular sleeve defining an external thread on an outer surface thereof; and
   a sensor cap assembly configured to screw onto the external thread of the tubular sleeve and to hold the sensor module thereto,
   wherein the at least one sensor includes at least one of: a temperature sensor, a pressure sensor, or an accelerometer.

2. The drain plug of claim 1, wherein the external thread of the tubular sleeve matches an external thread of a Schrader valve.

3. The drain plug of claim 1, wherein the stem portion defines a bore hole extending therethrough to provide fluid communication between the sensor module and an internal space of the component of the vehicle.

4. The drain plug of claim 1, wherein the stem portion defines a blind hole in fluid communication with the sensor module, and the stem portion is sealed to fluidly isolate the sensor module and an internal space of the component of the vehicle.

5. The drain plug of claim 1, wherein the at least one sensor includes a temperature sensor.

6. The drain plug of claim 1, wherein the at least one sensor includes a pressure sensor.

7. The drain plug of claim 1, wherein the sensor module further includes a processor configured to process a signal from the at least one sensor.

8. The drain plug of claim 7, wherein the at least one sensor includes an accelerometer, and wherein the processor is configured to process an acceleration signal from the accelerometer to determine at least one of: a condition indicative of bearing wear, or a condition indicative of an imbalance in the component of a vehicle.

9. The drain plug of claim 1, further comprising a cap configured to cover an end of the plug body opposite from the stem portion and to enclose the sensor module, and wherein the cap is made of a material that is transmissive to radio waves.

10. A drain plug for a component of a vehicle, comprising:
    a sensor module including at least one sensor and a wireless transmitter configured to transmit data regarding a reading from the at least one sensor;
    a plug body having a stem portion configured to plug a corresponding hole in the component of the vehicle, wherein the stem portion defines a blind hole in fluid communication with the sensor module, and the stem portion is sealed to fluidly isolate the sensor module and an internal space of the component of the vehicle;
    a tubular sleeve disposed in the blind hole, extending outwardly therefrom, and defining an external thread on an outer surface thereof outside of the blind hole; and
    a sensor cap assembly configured to screw onto the external thread of the tubular sleeve and to hold the sensor module thereto.

11. The drain plug of claim 10, wherein the external thread of the tubular sleeve matches an external thread of a Schrader valve.

12. The drain plug of claim 10, wherein the at least one sensor includes an accelerometer and a processor configured to an acceleration signal from the accelerometer to determine at least one of: a condition indicative of bearing wear, or a condition indicative of an imbalance in the component of a vehicle.

13. The drain plug of claim 10, wherein the at least one sensor includes a temperature sensor.

14. A system for wireless monitoring a component of a vehicle, comprising:
    a drain plug including: a plug body having a stem portion configured to plug a corresponding hole in the component of the vehicle, and a sensor module having at least one sensor and a wireless transmitter configured to transmit data regarding a reading from the at least one sensor;
    a cap configured to cover an end of the plug body opposite from the stem portion and to enclose the sensor module, and wherein the cap is made of a material that is transmissive to radio waves; and
    a receiver located on the vehicle and configured to receive the data from the wireless transmitter,
    wherein the at least one sensor includes at least one of a temperature sensor, a pressure sensor, and an accelerometer.

15. The system of claim 14, wherein the receiver is integrated within a pneumatic controller located on or near an axle of the vehicle.

16. The system of claim 14, further comprising a bridge located on the vehicle and configured to collect information from the drain plug and to enunciate a warning or a fault message based on the data regarding the reading from the at least one sensor.

17. The system of claim 16, further comprising a user interface located on the vehicle and in functional communication with the bridge, the user interface configured to display a warning or a message based on the data regarding the reading from the at least one sensor.

18. The system of claim 16, further comprising a server located remotely from the vehicle and in functional communication with the bridge, the server configured to receive and to store the data regarding the reading from the at least one sensor.

19. The system of claim 14, wherein the stem portion fluidly isolates the sensor module and an internal space of the component of the vehicle.

20. The system of claim 14, wherein the stem portion defines a blind hole in fluid communication with the sensor module.

* * * * *